UNITED STATES PATENT OFFICE.

HUGH KIRK MacGREGOR, OF CLYDEBANK, SCOTLAND.

DRESSING FOR FISH, &c.

SPECIFICATION forming part of Letters Patent No. 691,154, dated January 14, 1902.

Application filed September 24, 1901. Serial No. 76,433. (No specimens.)

*To all whom it may concern:*

Be it known that I, HUGH KIRK MACGREGOR, baker and purveyor, a subject of the King of the United Kingdom of Great Britain and Ireland, and a resident of Kilbowie Road Bakery, 72 Kilbowie road, Clydebank, Dumbartonshire, Scotland, have invented a Preparation for Dressing Fried Fish, Cutlets, and the Like, of which the following is a specification.

This invention relates to a preparation of crushed, toasted, or browned bread for dressing fried fish, cutlets, and the like.

I make pan-bread, which is then cut up into slices. It is then dried and browned in an oven. It is then crushed to powder. To one hundredweight of the powder I now add the following: six pounds fine salt, eight ounces ground nutmeg, eight ounces mace, eight ounces ground savory herbs, four ounces cloves, one pound Jamaica pepper, one and three-fourths pounds white pepper, the whole mixed thoroughly together.

The dressing can be put up into packets or contained in tins ready for use.

In using my prepared dressing the fish, cutlet, oyster, or other article to be cooked is first dipped in water, egg, or thin flour batter and then rolled in the prepared dressing until sufficiently coated therewith, and finally fried. Finely-chopped meat may also be mixed with bread-crumbs and the prepared dressing and rolled into balls or cakes and fried.

I claim—

The preparation for dressing fried fish, cutlets, and the like, consisting of crushed toasted or browned bread, to which is added fine salt; ground nutmeg, mace, ground savory herbs, cloves, Jamaica pepper and white pepper, substantially in the manner as set forth.

HUGH KIRK MacGREGOR.

Witnesses:
W. KIDD,
ROBERT CARR.